US012709524B2

(12) United States Patent
Lin

(10) Patent No.: US 12,709,524 B2
(45) Date of Patent: Aug. 18, 2026

(54) TOP-DRIVEN JACK

(71) Applicant: ZHEJIANG HONGLI (A/LIST) TOOLS CO., LTD., Jinhua (CN)

(72) Inventor: Cangze Lin, Jinhua (CN)

(73) Assignee: ZHEJIANG HONGLI (A/LIST) TOOLS CO., LTD., Jinhua (CN)

( * ) Notice: Subject to any disclaimer, the term of this patent is extended or adjusted under 35 U.S.C. 154(b) by 247 days.

(21) Appl. No.: 18/791,650

(22) Filed: Aug. 1, 2024

(65) Prior Publication Data

US 2025/0340412 A1 Nov. 6, 2025

(30) Foreign Application Priority Data

May 6, 2024 (CN) ......................... 202410549511.2

(51) Int. Cl.
*B66F 3/10* (2006.01)
*B60S 9/08* (2006.01)

(52) U.S. Cl.
CPC .. *B66F 3/10* (2013.01); *B60S 9/08* (2013.01)

(58) Field of Classification Search
CPC ...... B60S 9/04; B60S 9/06; B66F 3/08; B66F 3/10; B66F 2700/04
See application file for complete search history.

(56) References Cited

U.S. PATENT DOCUMENTS 2,708,374 A * 5/1955 Engh ......................... B66F 3/08 74/89.44

* cited by examiner

*Primary Examiner* — Christopher J. Besler
(74) *Attorney, Agent, or Firm* — HOWARD M COHN and Associates, LLC

(57) ABSTRACT

Disclosed is a top-driven jack, including an outer pipe, an inner pipe, a lead screw, a nut, a fixed part, and a handle; the inner pipe extends into the outer pipe; the nut is fixedly mounted on the inner pipe; the lead screw is movably mounted in the outer pipe through the fixed part and extends into the inner pipe, and is engaged with the nut; the fixed part includes a fixed seat and a movable sleeve; a connecting hole and an accommodating hole are formed in the movable sleeve; a connecting section is arranged at one end of the lead screw; the movable sleeve is movably connected with the fixed seat and embedded into the connecting hole through the connecting section and synchronously moves with the lead screw in the circumferential direction around the central line of the lead screw.

10 Claims, 17 Drawing Sheets

TOP-DRIVEN JACK

TECHNICAL FIELD

The present disclosure provides a top-driven jack.

BACKGROUND

Car culture is prevalent in Europe and United States. Europe and United States not only have a huge number of cars, but also have a rich variety of models for different usage scenarios. Trailers and recreational vehicles, which are of models that combine travel and accommodation, are indispensable in the lives of Europeans and Americans. Therefore, the popularity of such cars is very high, which in turn brings about related needs, especially jacks. After the trailers and recreational vehicles are parked stably at a station, it is needed to provide main support force for carriages through the jacks. The jacks can be adjusted freely. The outdoor terrain conditions cannot provide a flat parking area, so the jacks can be extended or shortened to adapt to the support height for leveling. The jacks are usually manually operated during use. Handles are arranged on the top of the jacks, and when holding and cranking the handles in the direction of rotation, telescopic structures inside the jacks change accordingly, and finally the whole jacks are extended or shortened. Manually operating the jacks has the disadvantage of being laborious to use. In order to reduce the labor intensity when using the jack in the prior art, a technical solution of driving the jack with an electric tool is disclosed. In this technical solution, the handle is not fixedly mounted on a lead screw of the jack, but can be quickly disassembled from and assembled to the lead screw of the jack. The cross-section of the part of the lead screw connected to the handle is regular hexagon, and the size of the regular hexagon matches the size of a hexagonal hole of a sleeve on the electric tool. When manual cranking is required, the handle can be combined with the jack. When the electric tool is required to drive, the handle can be removed and the lead screw can be inserted into the sleeve of the electric tool. Although switching between manual operation and electric operation can be achieved, the disassembly and assembly of the handle bring other use defects. The handle falls off very easily due to vibration during vehicle driving, or the handle needs to be stored after being removed, which brings inconvenience. It is needed to disassemble and assemble the handle to switch the jack between the manual operation and the electric operation in the prior art.

SUMMARY

The technical problem to be solved by the present disclosure is how to avoid disassembling and assembling parts when switching a jack between manual operation and electric operation, thereby obtaining a top-driven jack with high product integrity and stable structure.

In order to solve the technical problem above, the following technical solution is adopted in the present disclosure. A top-driven jack includes an outer pipe, an inner pipe, a lead screw, a nut, a fixed part, and a handle; the inner pipe extends into the outer pipe; the nut is fixedly mounted on the inner pipe; the lead screw is movably mounted in the outer pipe through the fixed part; the lead screw extends into the inner pipe; the lead screw is engaged with the nut; the fixed part includes a fixed seat, a movable sleeve, a spring, a bearing, and dowel pins; the fixed seat is fixedly connected with the outer pipe, and the fixed seat is provided with pin holes, an assembly hole, a cylindrical cavity, an upper annular cavity, a lower annular cavity, and two connecting grooves; the cylindrical cavity communicates with the assembly hole, and a center line of the cylindrical cavity is overlapped with a center line of the assembly hole; the cylindrical cavity is positioned above the assembly hole; the pin holes are perpendicular to the assembly hole; a diameter of the cylindrical cavity is larger than a diameter of the assembly hole; an inner diameter of the upper annular cavity and an inner diameter of the lower annular cavity are both equal to the diameter of the cylindrical cavity; the upper annular cavity is positioned at an upper end of the cylindrical cavity, and the upper annular cavity communicates with the cylindrical cavity; the lower annular cavity is positioned at a lower end of the cylindrical cavity, and the lower annular cavity communicates with the cylindrical cavity; the connecting grooves are straight; one end of each connecting groove communicates with the upper annular cavity, and the other end of each connecting groove communicates with the lower annular cavity; a side surface of each connecting groove communicates with the cylindrical cavity; the lead screw passes through the assembly hole; one end of each dowel pin is inserted into the corresponding pin hole; a limiting groove is formed in the lead screw; the limiting groove annularly surrounds the center line of the lead screw; the other end of each dowel pin is embedded into the limiting groove; a flange is arranged on the lead screw; the bearing is mounted on the lead screw and positioned between the flange and the fixed seat; the flange is positioned above the nut; the movable sleeve is provided with a cylindrical part; two limiting columns are arranged on the surface of the cylindrical part of the movable sleeve; the handle is mounted on the movable sleeve; a connecting hole and an accommodating hole are formed in the movable sleeve; the connecting hole communicates with the accommodating hole, and a center line of the connecting hole is overlapped with a center line of the accommodating hole; the accommodating hole is positioned above the connecting hole, and a minimum width of the accommodating hole is greater than a maximum width of the connecting hole; a cross section of the connecting hole is of a non-centrosymmetric structure; a connecting section is arranged at one end of the lead screw; a cross section of the connecting section is of a non-centrosymmetric structure, and a cross section structure of the connecting section corresponds to a cross section structure of the connecting hole; the connecting section of the lead screw extends into the movable sleeve; the end of the lead screw provided with the connecting section passes through the cylindrical cavity; the center line of the lead screw is overlapped with the center line of the cylindrical cavity; the connecting section protrudes out of the fixed seat; the cylindrical part of the movable sleeve extends into the cylindrical cavity; the movable sleeve is movably connected with the fixed seat; the lead screw is movably connected with the movable sleeve; the spring is mounted on the lead screw and is positioned between the movable sleeve and the fixed seat; the moving range of the cylindrical part of the movable sleeve is intersected with the cylindrical cavity; the moving range of the limiting columns is positioned in the upper annular cavity, the lower annular cavity and the connecting grooves; the movable sleeve is embedded into the connecting hole through the connecting section and synchronously moves with the lead screw in the circumferential direction around the center line of the lead screw; and the movable sleeve is completely separated from the connecting hole through the connecting section and positioned in the accommodating hole and asynchronously moves with the lead screw in the circumferential direction around the center line of the lead screw.

In the technical solution, the fixed part has a clutch function; the movable sleeve in the fixed seat can change the relative position and keep the position; the movable sleeve is movably connected with the lead screw, and a connection relationship between the movable sleeve and the lead screw in the circumferential direction around the center line of the lead screw may be established after the position of the movable sleeve relative to the lead screw is changed. A clutch structure is constructed among the movable sleeve, the fixed seat and the lead screw; after the movable sleeve moves towards the exterior of the fixed seat, the interior of the movable sleeve and the lead screw are connected through a structure with a non-centrosymmetric cross section, at the moment, the movable sleeve is embedded into the connecting hole through the connecting section and synchronously moves with the lead screw in the circumferential direction around the center line of the lead screw, and the handle is driven so as to drive the jack; after the movable sleeve moves towards the interior of the fixed seat, a degree of freedom between the interior of the movable sleeve and the lead screw in the direction along the center line of the lead screw and in the circumferential direction around the center line of the lead screw is obtained, and at the moment, the movable sleeve is completely separated from the connecting hole through the connecting section and positioned in the accommodating hole and asynchronously moves with the lead screw in the circumferential direction around the center line of the lead screw. The movable sleeve can rotate independently of the lead screw, and the movable sleeve and the lead screw do not interfere with each other; the jack cannot be driven after the handle is driven; and the jack can be driven through an electric tool after a sleeve of the electric tool is in butt joint with the connecting section of the lead screw. Therefore, the jack can be switched between the manual operation and the electric operation without disassembling and assembling parts in the technical solution.

In the technical solution, the clutch function is stable. The fixed seat is internally provided with corresponding moving spaces for station switching of the movable sleeve, namely the upper annular cavity, the lower annular cavity and the connecting grooves; the direction of an acting force that drives the lead screw to rotate is not in the direction along the center line of the lead screw at all but in the direction perpendicular to the center line of the lead screw; the spring extrudes the movable sleeve in the direction along the center line of the lead screw towards the outside of the fixed seat all the time; the movable sleeve can keep the connection relationship that the movable sleeve is only static relative to the fixed seat or the lead screw, so that when the handle is normally manually cranked or the electric tool drives the lead screw, the relative position of the movable sleeve in the fixed seat cannot be changed, and the clutch function is stably exerted. It is to be noted that after the movable sleeve moves towards the interior of the fixed seat, the position limitation of the interior of the movable sleeve is not affected by the lead screw, that is, the lead screw cannot limit the position of the movable sleeve on the fixed seat, and the position of the movable sleeve on the fixed seat is restrained by the fixed seat all the time.

The accommodating hole of the movable sleeve is larger than the connecting hole, so there is a gap between the connecting section of the lead screw and the movable sleeve when the connecting section of the lead screw is positioned in the accommodating hole; the gap can accommodate the sleeve of the electric tool, and at the moment, the sleeve is not connected with the movable sleeve. This design aims at considering that the electric operation mode tends to be unique, that is, it is encouraged to use the electric tool to drive the jack after combining with the designated sleeve; if the connecting section is positioned outside the movable sleeve, a situation that the electric tool is combined with other non-designated sleeves to try to drive the jack possibly occurs, at the moment, the sleeve and the connecting section which are not correct in models extremely likely slip, consequently, a reasonable structure of the connecting section is damaged by mis-operation, and long-term normal use is not facilitated. Therefore, due to the design that the movable sleeve surrounds the connecting section, the purpose of supervising and urging to use the sleeve of the correct model can be achieved.

The switching frequency between the manual operation and the electric operation is very low in the whole jack working period, and there is no requirement for frequent switching in the actual working condition, so that the clutch structure in the technical solution supports switching between the manual operation and the electric operation, but does not support high switching frequency between the manual operation and the electric operation. In order to ensure smooth switching, two connecting grooves which are symmetrically distributed relative to the center line of the cylindrical cavity are formed in the fixed seat. Therefore, the limiting columns of the movable sleeve can be aligned with the connecting grooves by rotating by 180° at most, and the whole jack enters the switching state.

The spring is always in a compressed state, and the spring applies an acting force to the movable sleeve, which needs to be borne by the limiting columns. In order to balance the stress on the movable sleeve, two limiting columns which are symmetrically distributed relative to the center line of the lead screw are arranged on the surface of the cylindrical part of the movable sleeve. Therefore, the stress balance of the movable sleeve is ensured, and the movable sleeve can be prevented from shaking.

In order to improve the connecting strength of the fixed seat and the outer pipe, the lower end of the fixed seat is embedded into the outer pipe, and the side face of the upper end of the fixed seat is flush with the surface of the outer pipe.

The cylindrical cavity, the upper annular cavity, the lower annular cavity, and the connecting grooves in the fixed seat can be obtained from a complete metal material or a plurality of metal materials through existing machining conditions; and in case of an assembling process, it is needed to consider the assembling difficulty. Therefore, according to the technical solution, a fixed seat structure which is easy to machine and assemble is provided, the fixed seat includes a main body and an end cover; the end cover is fixedly mounted on the main body through a bolt; and the upper annular cavity is positioned between the main body and the end cover. The main body is obtained by machining a complete metal, the end cover is of a plate-shaped structure, and the main body and the end cover can be assembled by bolt fastening during assembling. In addition, the main body is of an open structure at the upper annular cavity, and therefore, the width of the upper annular cavity in the direction parallel to the center line of the lead screw is easier to control during manufacturing.

In order to make the position relationship between the lead screw and the fixed seat more stable and prevent the surface of the jack from hollow structures, the dowel pins are distributed around the center line of the lead screw at equal angles, and the pin holes are positioned in the outer pipe.

According to a preferred solution of the non-centrosymmetric structure, the cross section structure of the connecting section is in a shape of one of regular polygon, oval, quincunx and concave polygon. The regular polygon may be regular triangle, square, regular pentagon, regular hexagon and the like; the quincunx may be four-petal quincunx, five-petal quincunx and six-petal quincunx; and the concave polygon may be pentagram, hexagram, decagram and the like.

When the upper annular cavity is used for enabling the connecting section of the lead screw to be embedded into the connecting hole, the movable sleeve and the lead screw synchronously move in the circumferential direction around the center line of the lead screw, it is needed to ensure that the space position of the movable sleeve cannot be changed at will at the moment, and especially it needs to avoid shaking the movable sleeve as much as possible, so the size of the upper annular cavity needs to be slightly larger than the diameter of the limiting columns, and the limiting columns in the upper annular cavity are in clearance fit with the fixed seat. When the lower annular cavity is used for enabling the connecting section to be completely separated from the connecting hole and positioned in the accommodating hole, the movable sleeve and the lead screw asynchronously move in the circumferential direction around the center line of the lead screw, and at the moment, it is also needed to be kept that the space position of the movable sleeve is relatively stable; however, it is considered that the lower annular cavity is positioned in a closed structure, which is not beneficial to finish machining, so the size of the lower annular cavity can be larger than that of the upper annular cavity. Thus, the width of the upper annular cavity in the direction parallel to the center line of the lead screw is smaller than that of the lower annular cavity in the direction parallel to the center line of the lead screw in the technical solution.

The spring needs enough compression capacity to perform a reset function on the movable sleeve; in order to prevent the spring from being bent in a compression state, an upper limiting hole is formed in the movable sleeve and positioned below the connecting hole; the diameter of the upper limiting hole is larger than that of the connecting hole; a lower limiting hole is formed in the fixed seat and positioned below the cylindrical cavity; the diameter of the lower limiting hole is smaller than that of the cylindrical cavity; and one end of the spring is positioned in the upper limiting hole, and the other end of the spring is positioned in the lower limiting hole. The spring is limited through the upper limiting hole and the lower limiting hole.

By means of the technical solution in the present disclosure, the top-driven jack can be switched between the manual operation and the electric operation without disassembling and assembling the parts, the switching between the manual operation and the electric operation is achieved through the clutch structure which has stable working performance, moreover, an unreasonable combination mode can be avoided in the electric operation process, and therefore the service life is prolonged.

BRIEF DESCRIPTION OF FIGURES

The present disclosure will be further described in detail below in conjunction with the accompanying drawings and specific embodiments.

DETAILED DESCRIPTION

Figure 1:
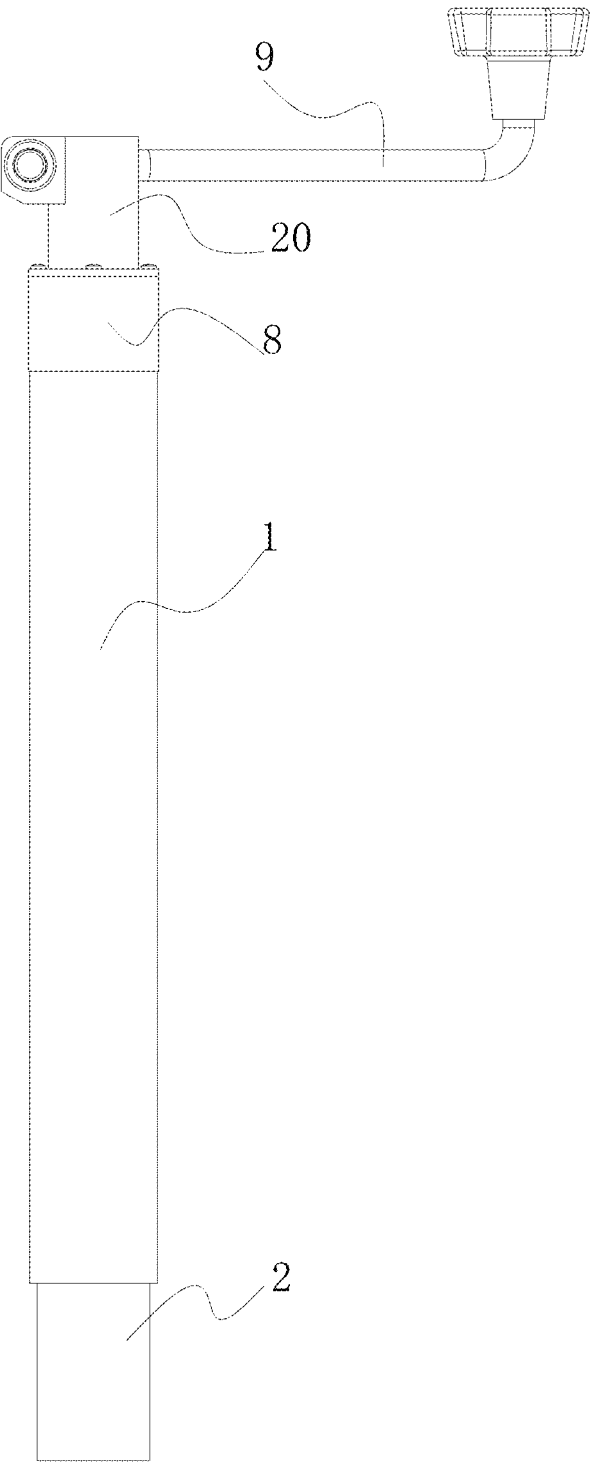
FIG. 1 is a main view of a top-driven jack in a synchronous state according to Embodiment I of the present disclosure.
Figure 2:
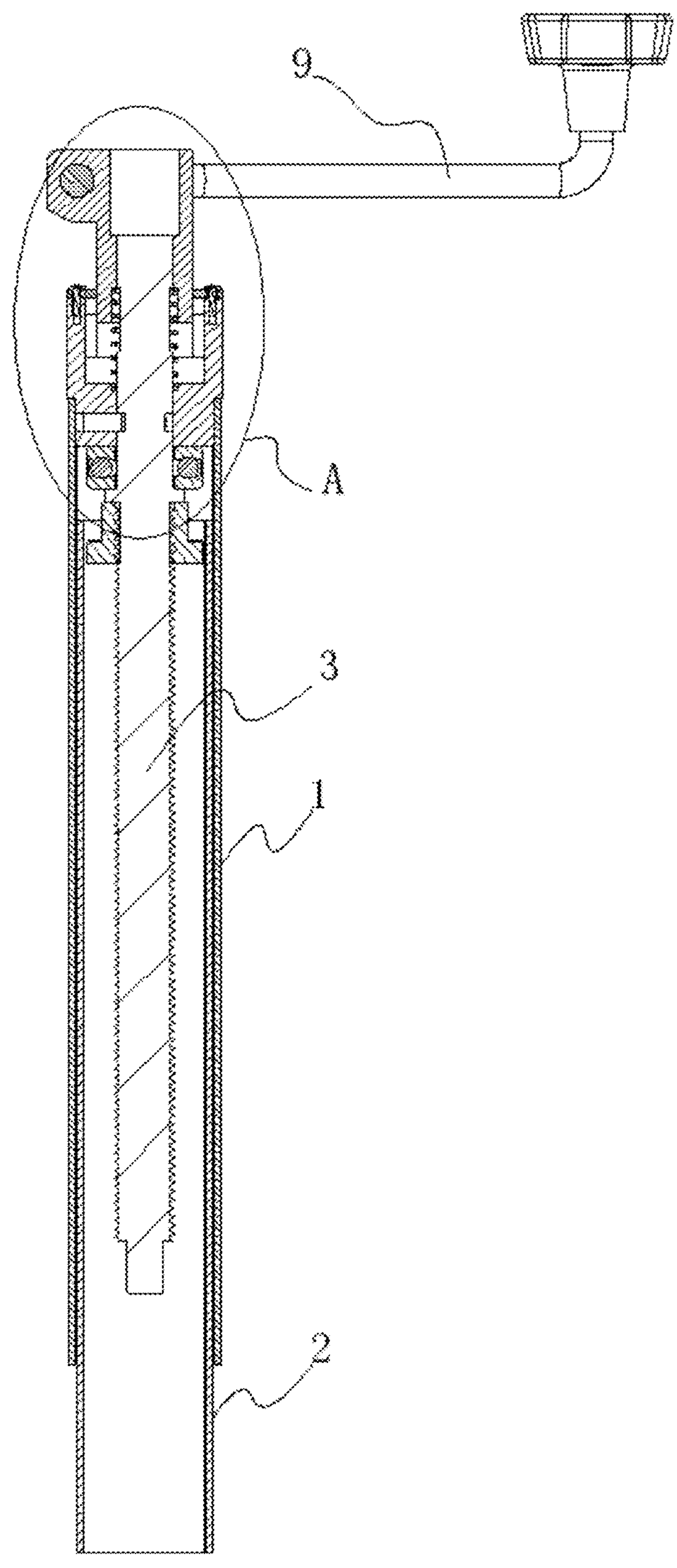
FIG. 2 is a schematic internal structure diagram I of the top-driven jack in a synchronous state according to Embodiment I of the present disclosure.
Figure 3:
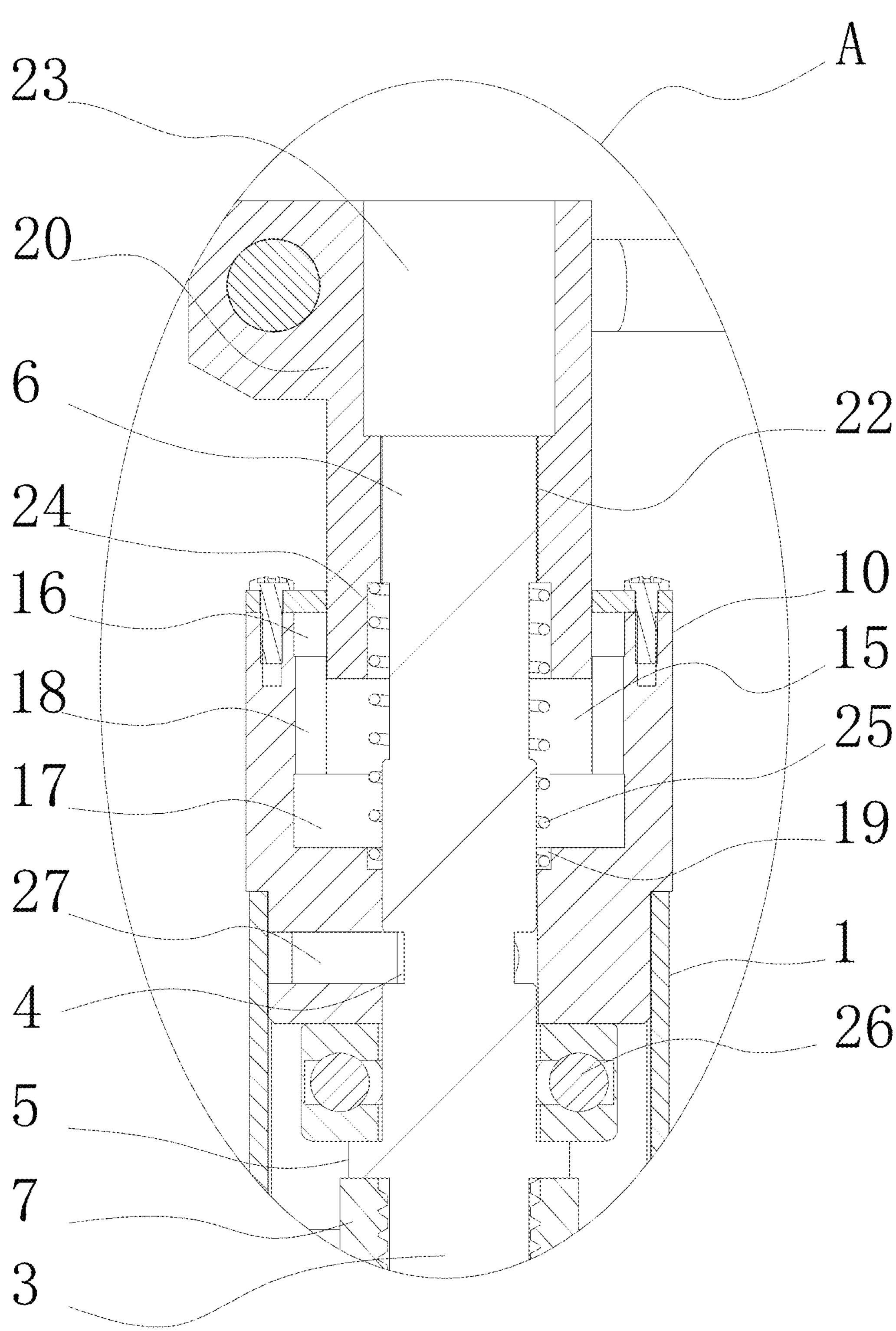
FIG. 3 is an enlarged view of portion A shown in FIG. 2.
Figure 4:
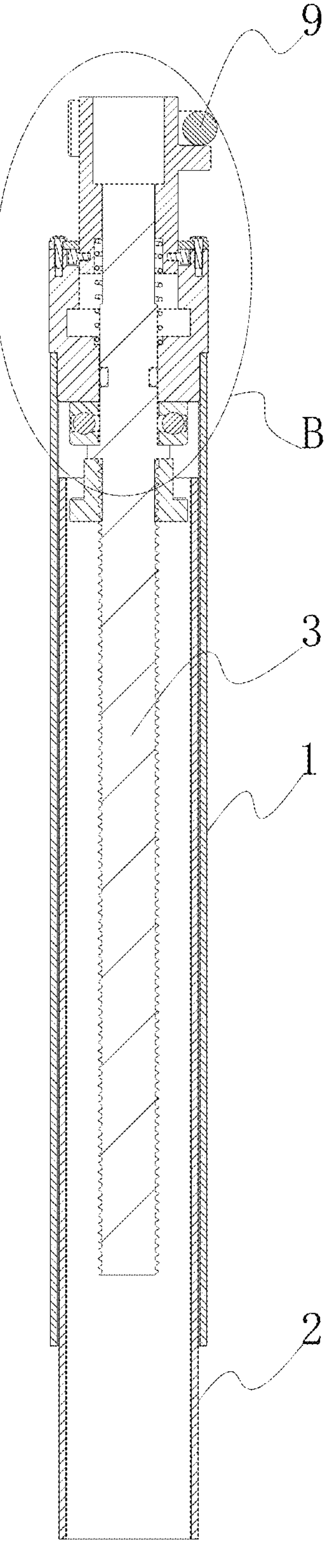
FIG. 4 is a schematic internal structure diagram II of the top-driven jack in a synchronous state according to Embodiment I of the present disclosure.
Figure 5:
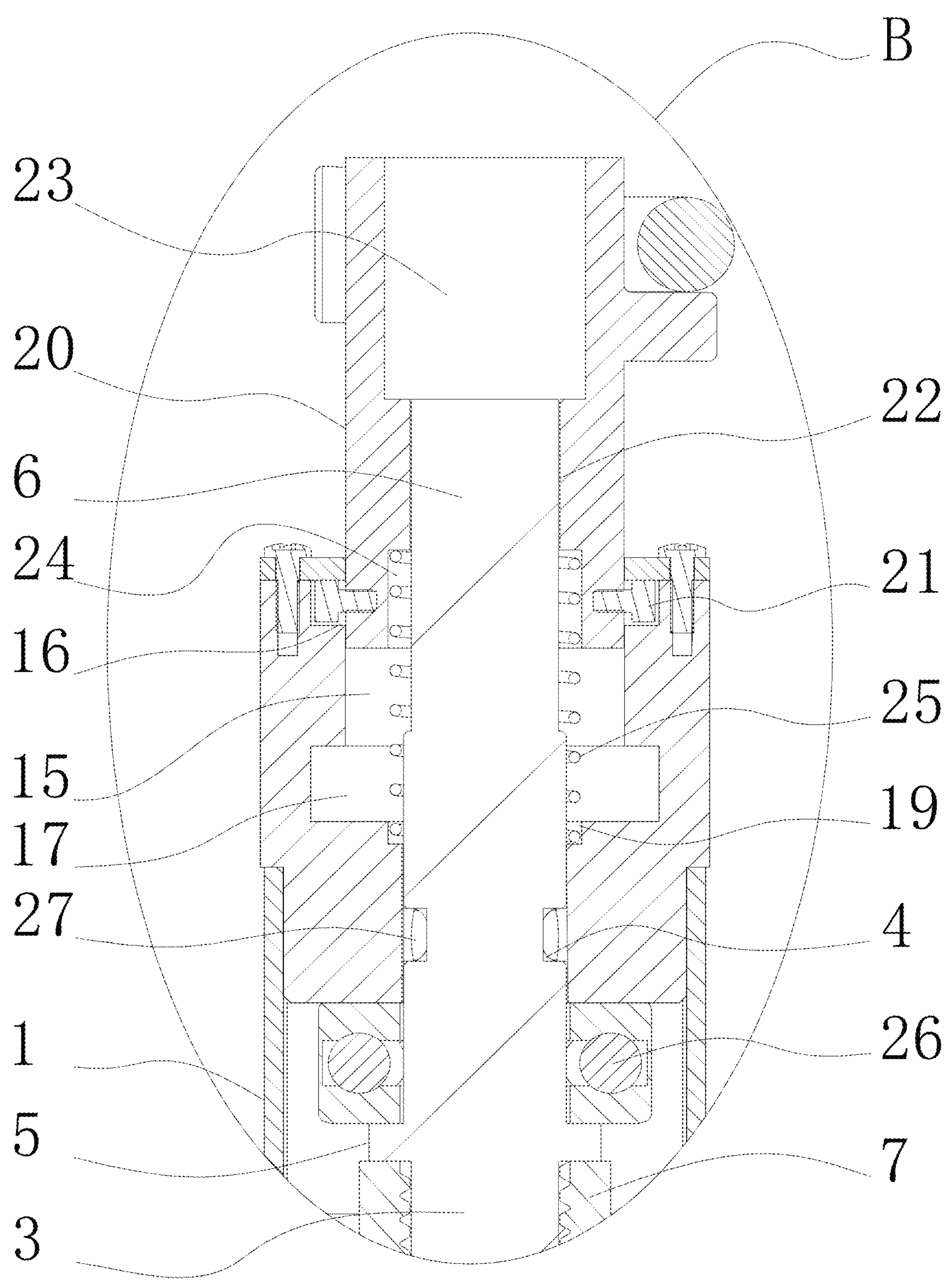
FIG. 5 is an enlarged view of portion B shown in FIG. 4.
Figure 6:
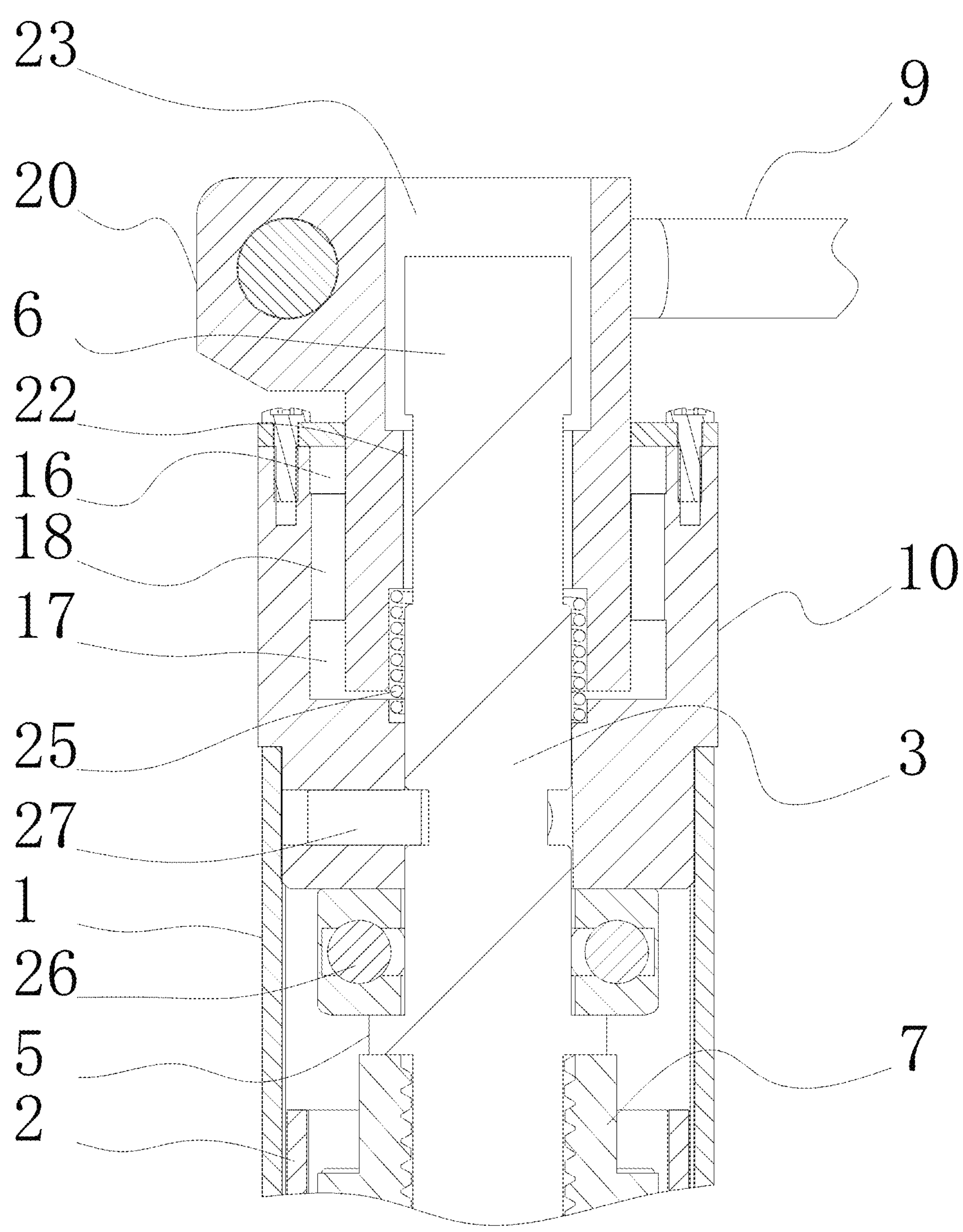
FIG. 6 is a schematic internal structure diagram I of the top-driven jack in an asynchronous state according to Embodiment I of the present disclosure.
Figure 7:
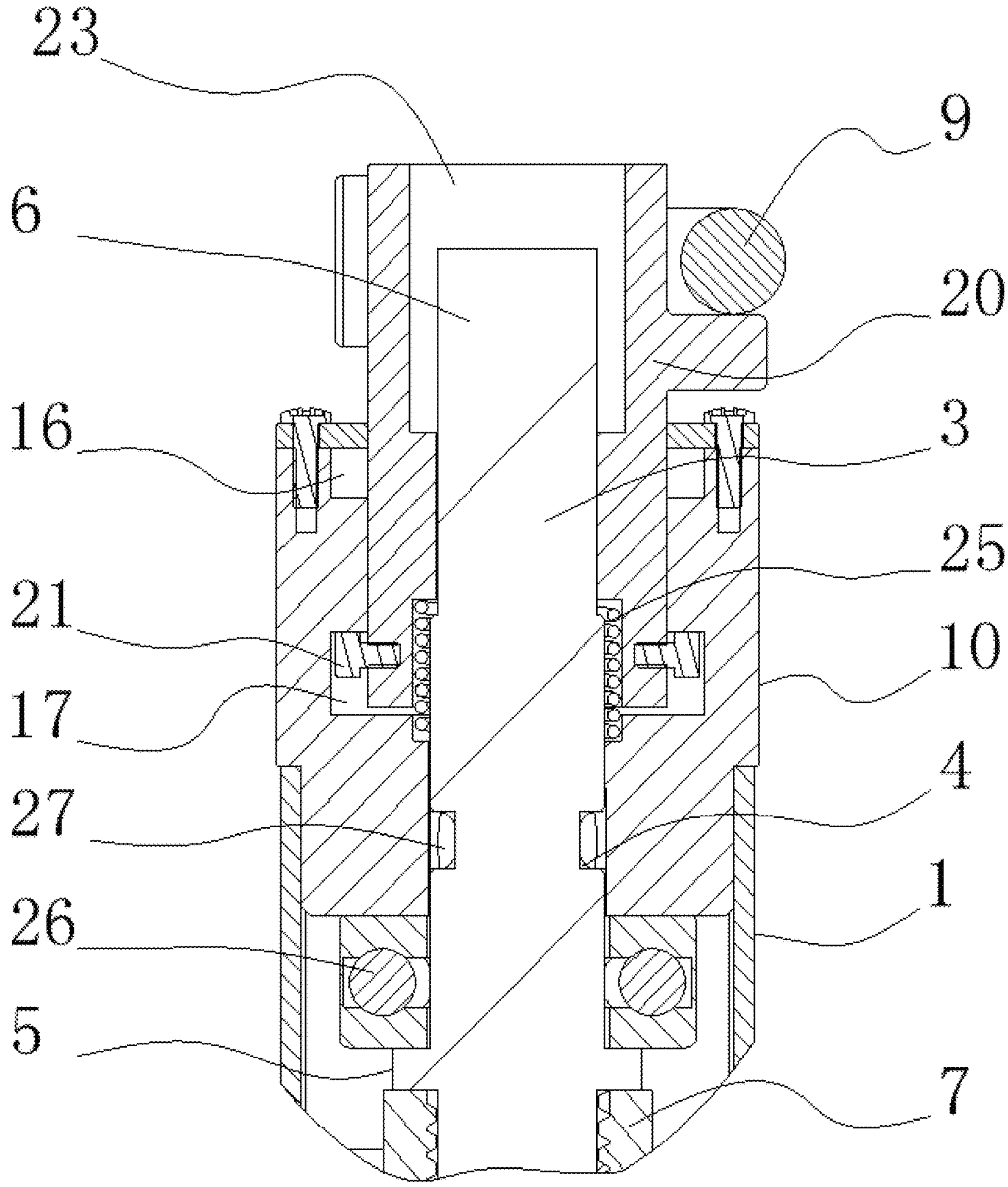
FIG. 7 is a schematic internal structure diagram II of the top-driven jack in an asynchronous state according to Embodiment I of the present disclosure.
Figure 8:
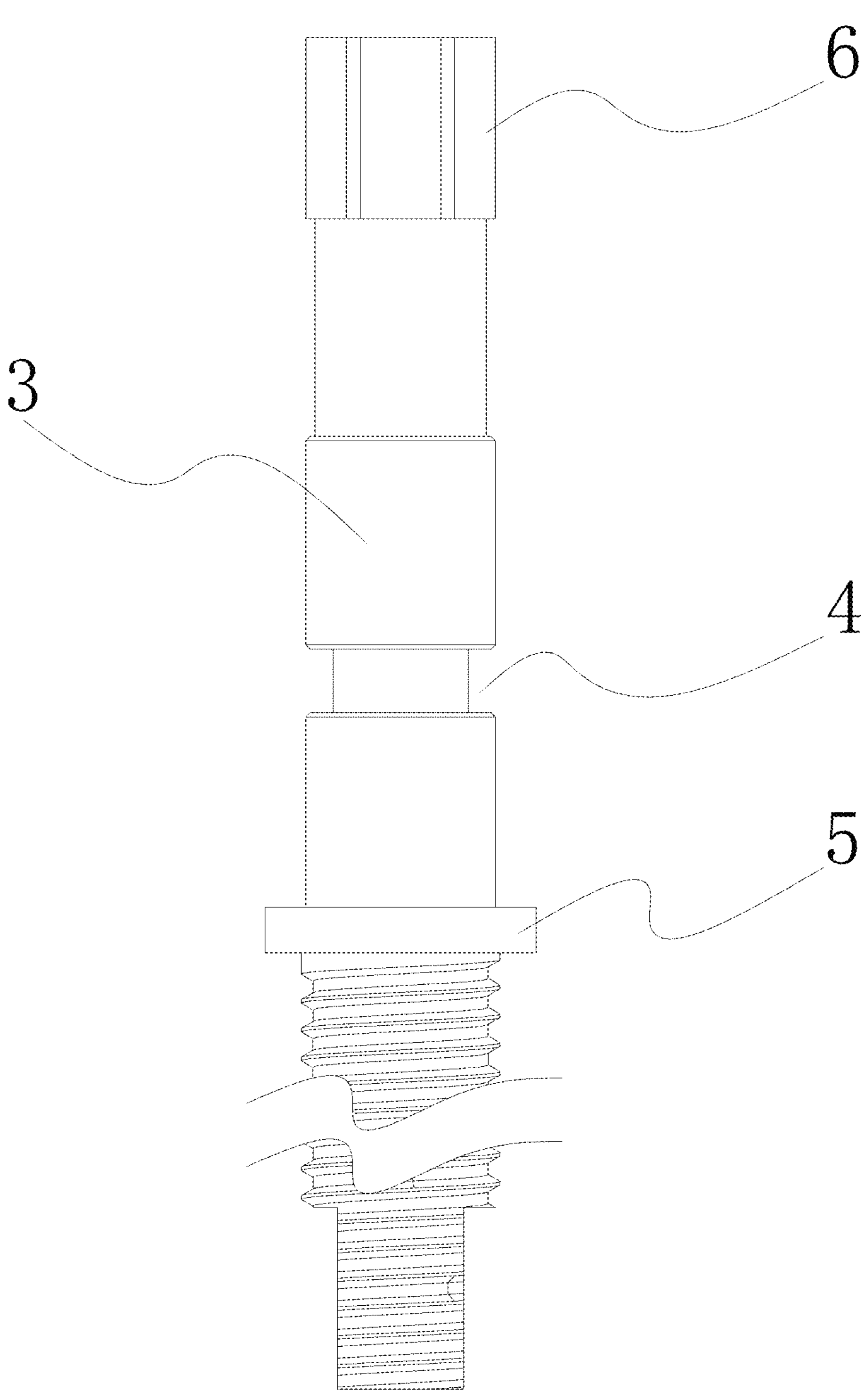
FIG. 8 is a main view of a lead screw of the top-driven jack according to Embodiment I of the present disclosure.
Figure 9:
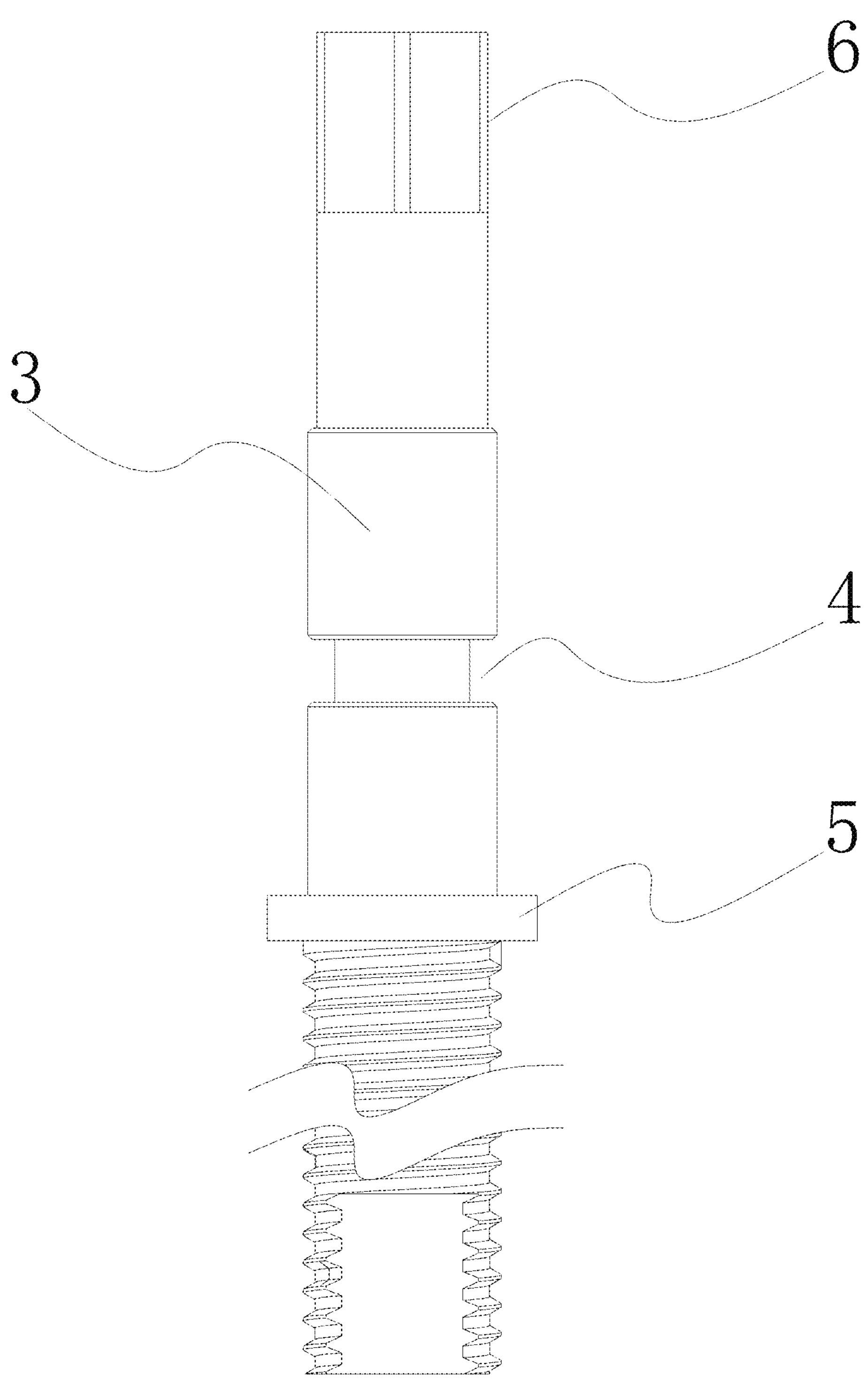
FIG. 9 is a left view of FIG. 8.
Figure 10:
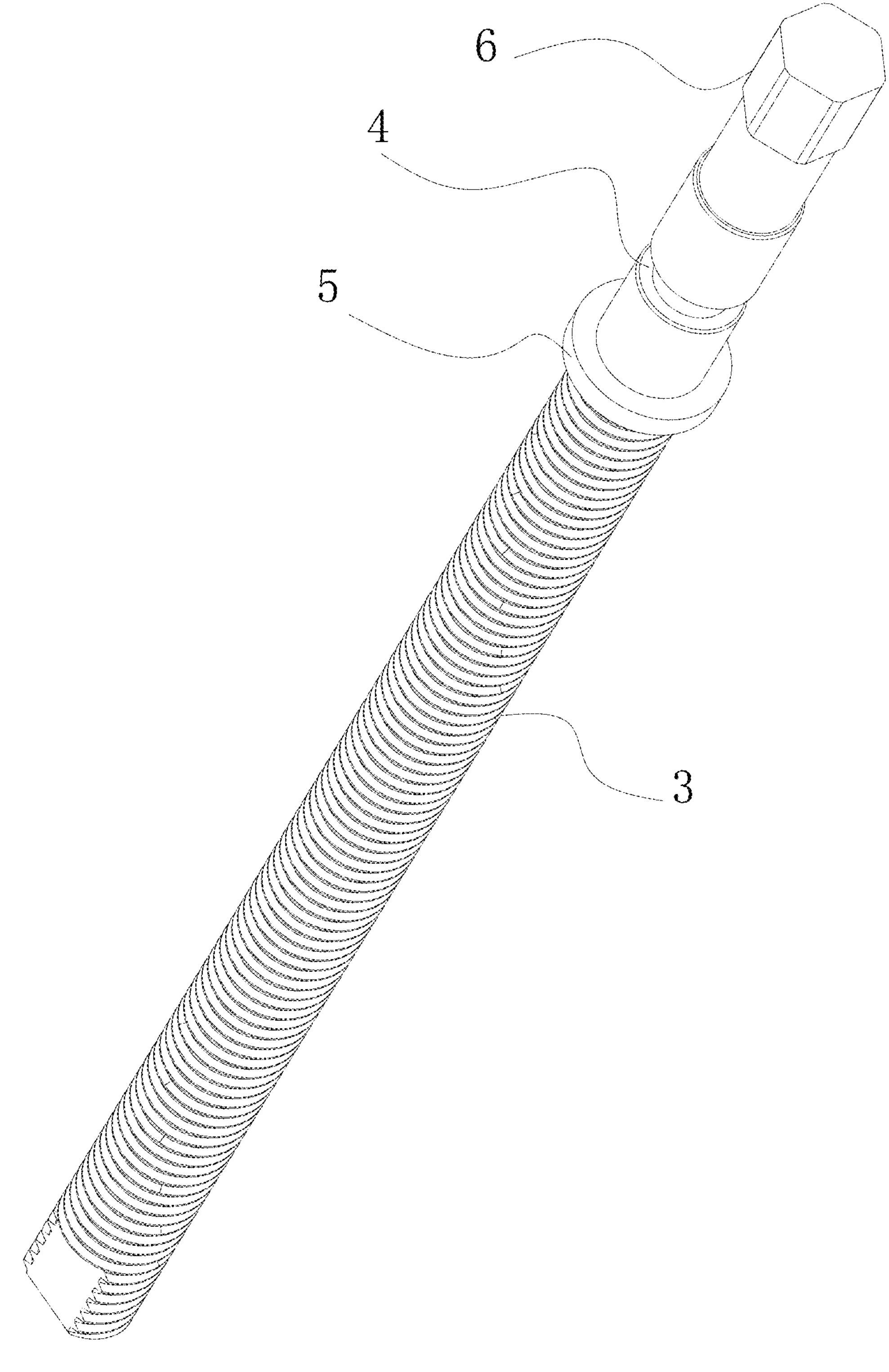
FIG. 10 is a three-dimensional diagram of a lead screw of the top-driven jack according to Embodiment I of the present disclosure.
Figure 11:
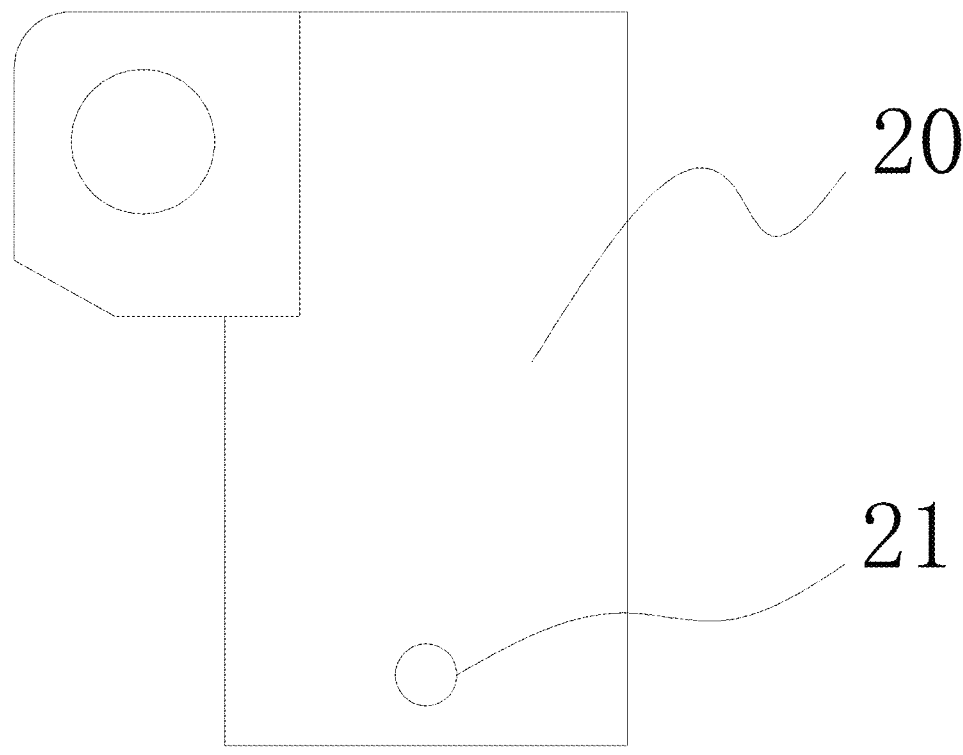
FIG. 11 is a main view of a movable sleeve of the top-driven jack according to Embodiment I of the present disclosure.
Figure 12:
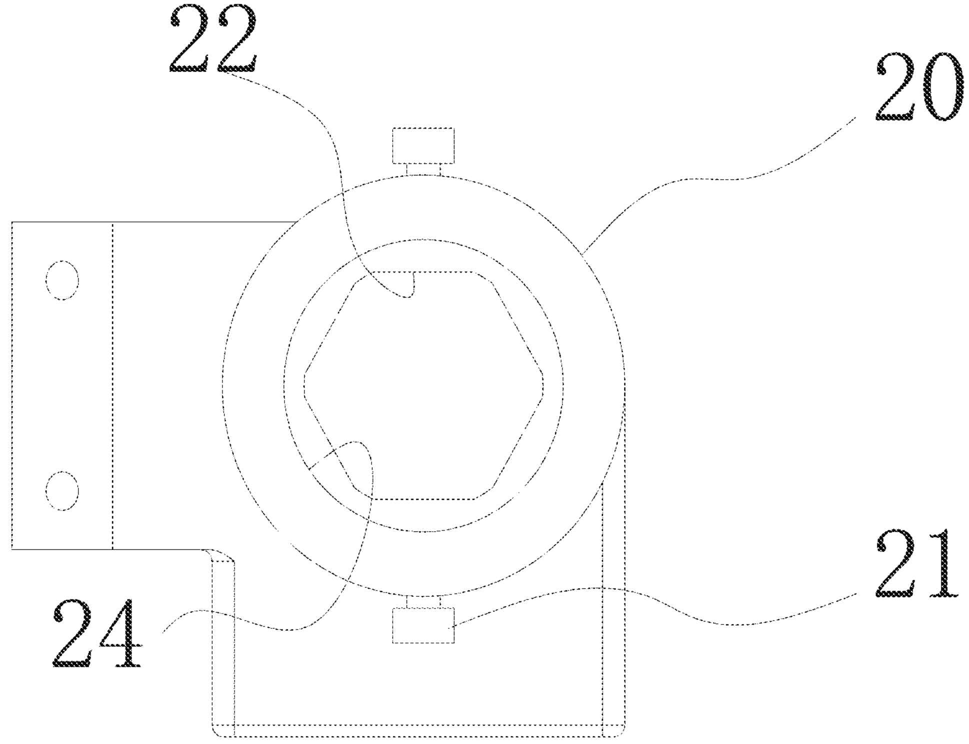
FIG. 12 is an upward view of FIG. 11.
Figure 13:
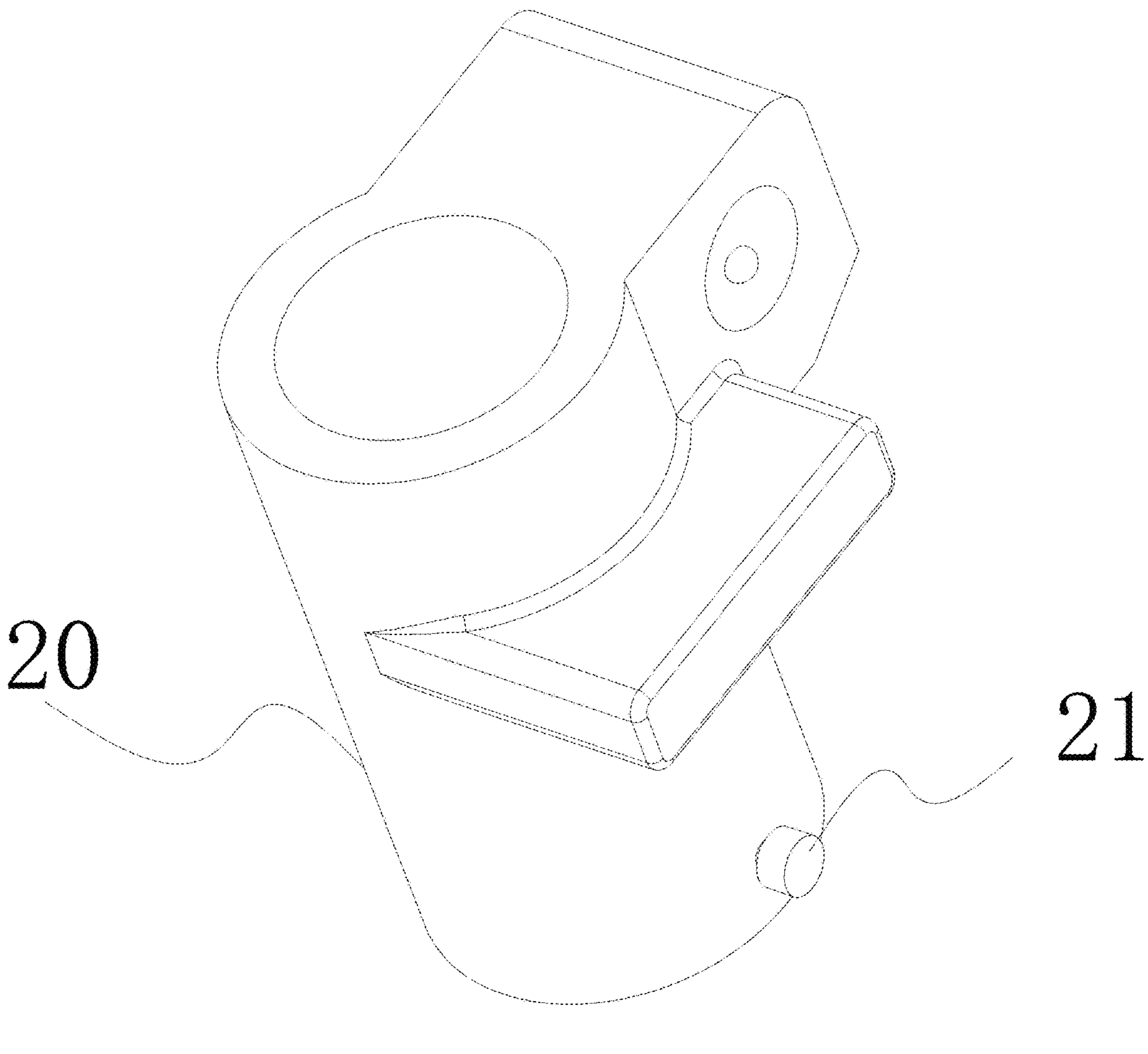
FIG. 13 is a three-dimensional diagram of a movable sleeve of the top-driven jack according to Embodiment I of the present disclosure.
Figure 14:
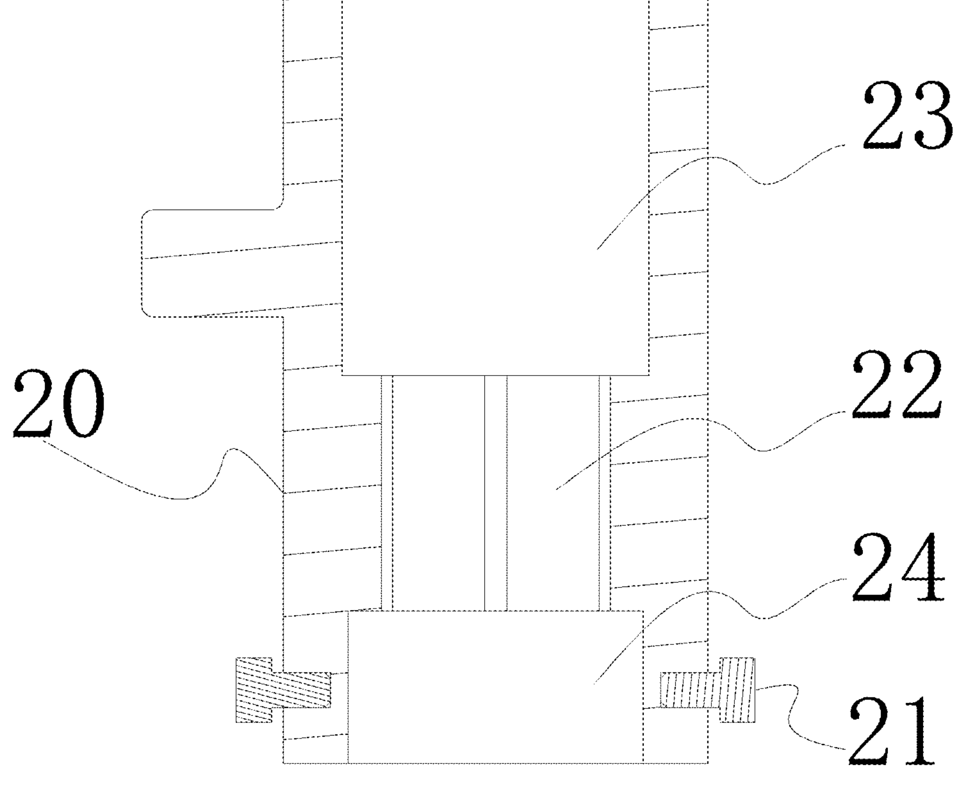
FIG. 14 is a schematic internal structure diagram I of a movable sleeve of the top-driven jack according to Embodiment I of the present disclosure.
Figure 15:
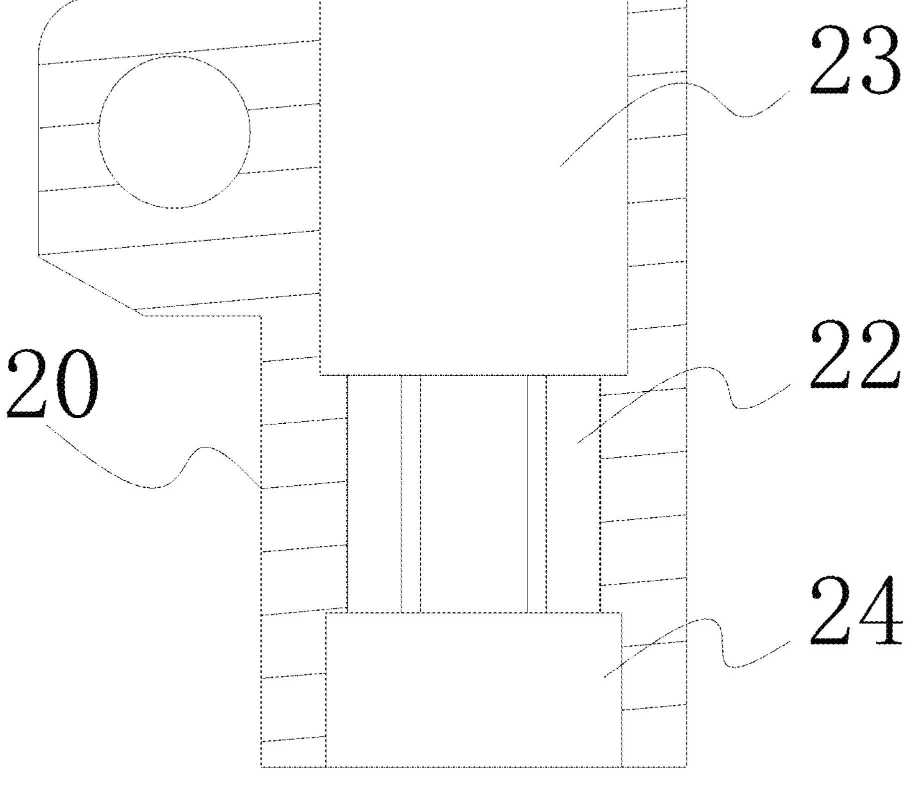
FIG. 15 is a schematic internal structure diagram II of a movable sleeve of the top-driven jack according to Embodiment I of the present disclosure.
Figure 16:
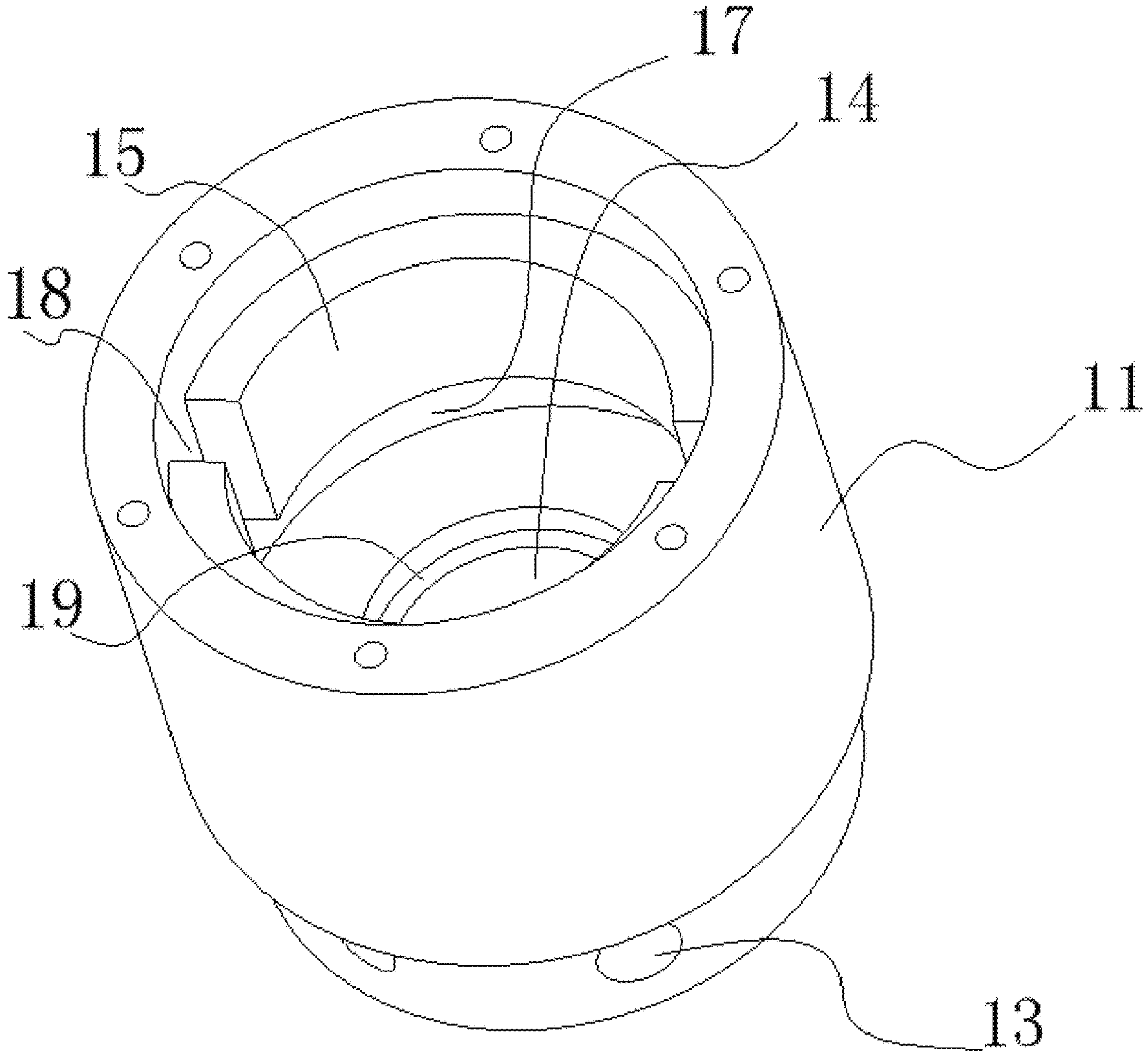
FIG. 16 is a three-dimensional diagram of a main body of a fixed seat of the top-driven jack according to Embodiment I of the present disclosure.
Figure 17:
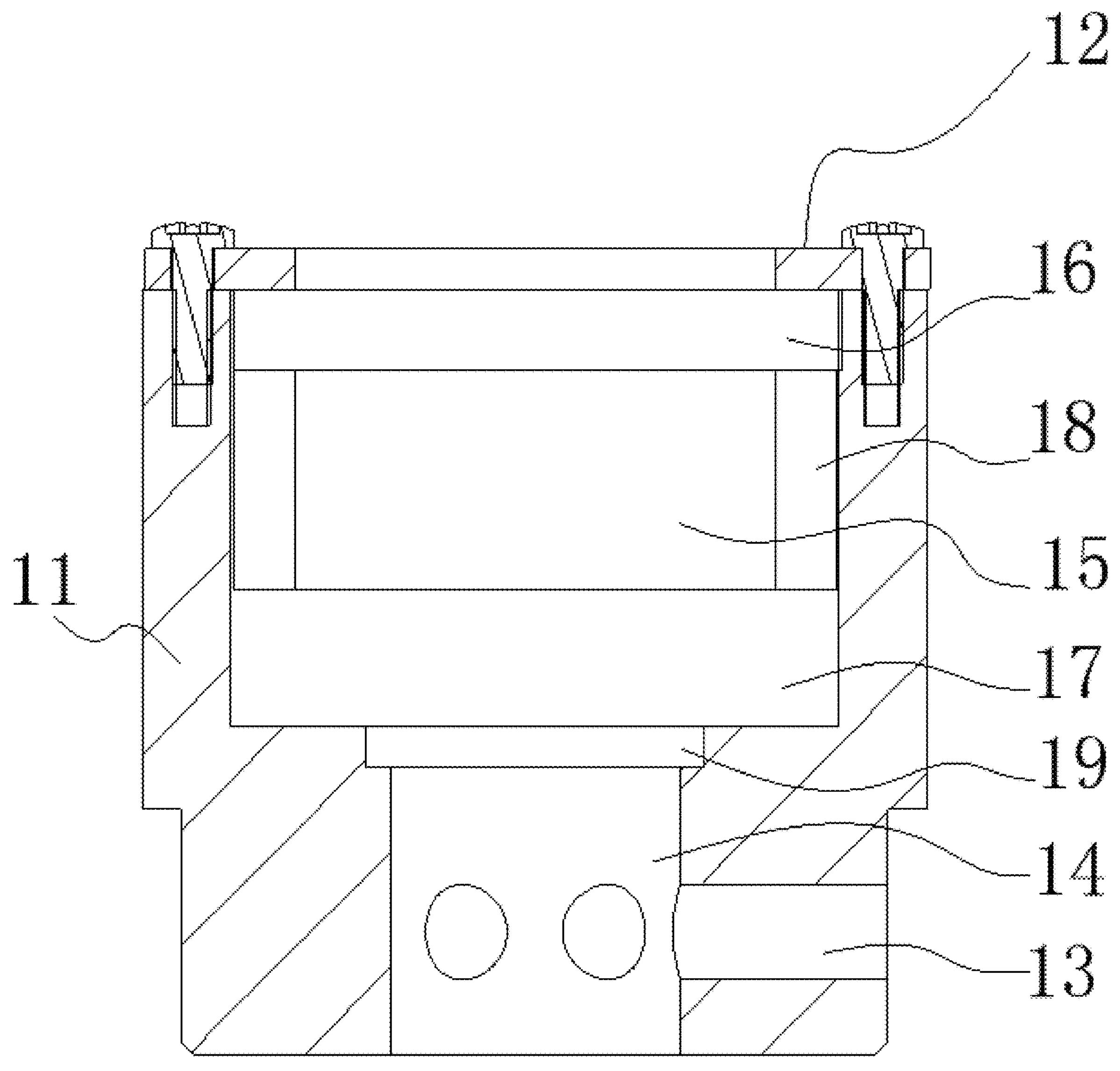
FIG. 17 is a schematic internal structure diagram I of a fixed seat of the top-driven jack according to Embodiment I of the present disclosure.
Figure 18:
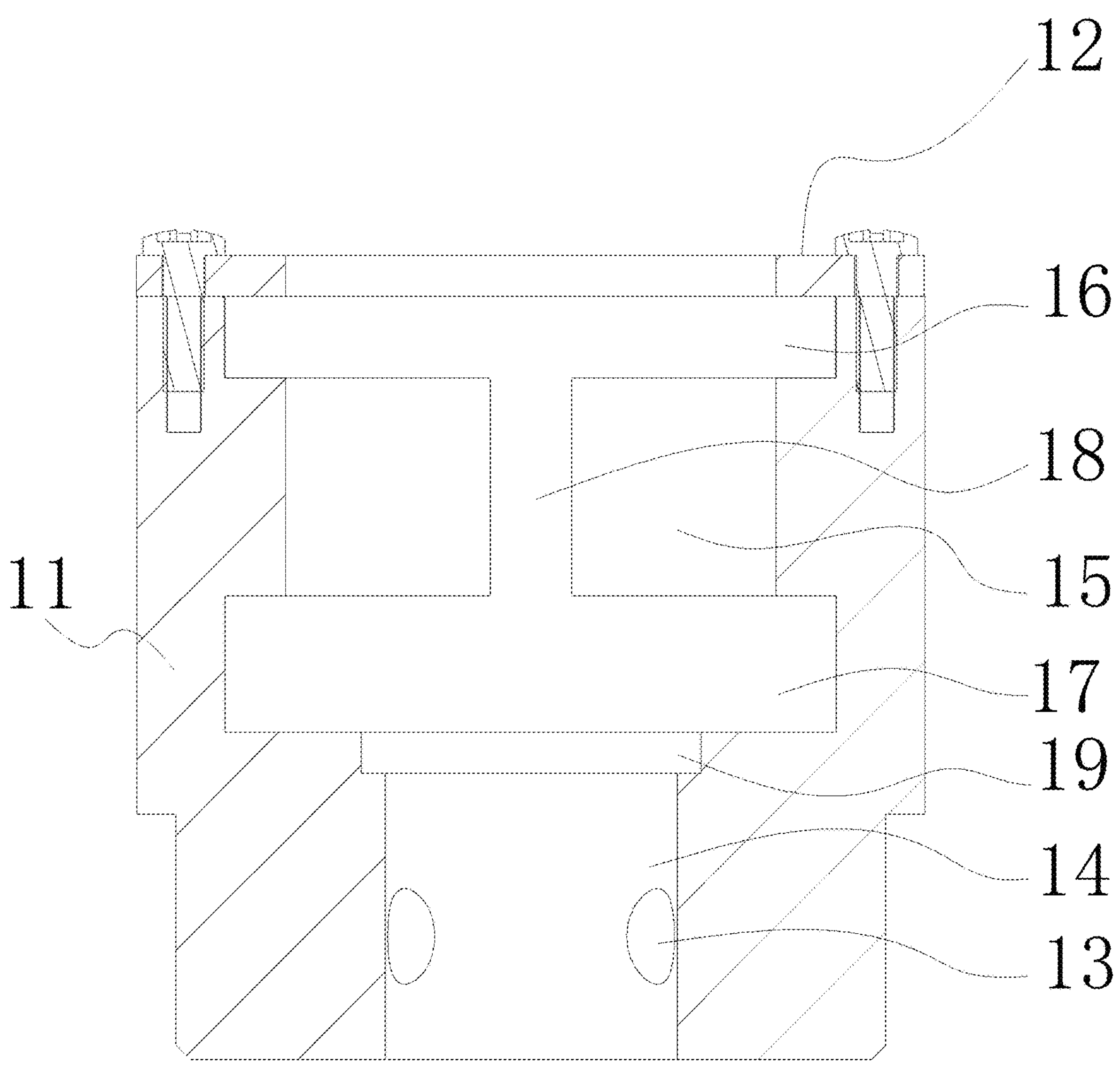
FIG. 18 is a schematic internal structure diagram II of a fixed seat of the top-driven jack according to Embodiment I of the present disclosure.

FIG. 1 to FIG. 18 show Embodiment I of the present disclosure.

A top-driven jack includes an outer pipe 1, an inner pipe 2, a lead screw 3, a nut 7, a fixed part 8, and a handle 9.

The nut 7 is fixedly mounted on the inner pipe 2; the nut 7 and the inner pipe 2 cannot move independently. The lead screw 3 extends into the inner pipe 2, and the lead screw 3 is engaged with the nut 7. The inner pipe 2 extends into the outer pipe 1, and the lead screw 3 is movably mounted in the outer pipe 1 through the fixed part 8.

The fixed part 8 includes a fixed seat 10, a movable sleeve 20, a spring 25, a bearing 26, and dowel pins 27.

The fixed seat 10 consists of a main body 11 and an end cover 12.

The outer part of the main body 11 is of a boss structure with a wide end and a narrow end. The narrow end of the main body 11 is embedded into the outer pipe 1; the wide end of the main body 11 is positioned outside the outer pipe 1; as the jack is in a vertical state when in use, the narrow end of the main body 11 is positioned below the wide end of the main body 11, that is, the lower end of the main body 11 is embedded into the outer pipe 1. After being combined, the main body 11 and the outer pipe 1 are fixedly connected in a welding manner; and through surface polishing treatment, the wide end of the main body 11, namely the side surface of the upper end, is flush with the surface of the outer pipe 1.

The main body 11 is hollowed out and specifically internally includes pin holes 13, an assembly hole 14, a cylindrical cavity 15, an upper annular groove, a lower annular cavity 17, connecting grooves 18, and a lower limiting hole 19.

The end cover 12 is of an annular structure, is fixedly mounted on the main body 11 through a bolt and directly covers the upper annular groove after mounting, so that the upper annular groove is surrounded by the main body 11 and the end cover 12, the sealing degree is increased, and the upper annular cavity 16 is formed. The upper annular cavity 16 is positioned between the main body 11 and the end cover 12. That is, the pin holes 13, the assembling hole 14, the cylindrical cavity 15, the upper annular cavity 16, the lower annular cavity 17, and the connecting grooves 18 are formed in the fixed seat 10.

On the center line of the fixed seat 10, the cylindrical cavity 15, the lower limiting hole 19, and the assembly hole 14 are arranged one by one; and the center line of the fixed seat 10, the center line of the cylindrical cavity 15, the center line of the assembly hole 14 and the center line of the lower limiting hole 19 are overlapped with each other. The lower limiting hole 19 is positioned between the cylindrical cavity 15 and the assembly hole 14, the cylindrical cavity 15 communicates with the lower limiting hole 19, and the lower limiting hole 19 communicates with the assembly hole 14. The diameter of the assembly hole 14 corresponds to the diameter of the lead screw 3, and the assembly hole 14 is in clearance fit with the lead screw 3. The diameter of the lower limiting hole 19 is larger than that of the assembly hole 14, and the lower limiting hole is positioned above the assembly hole 14 and below the cylindrical cavity 15; and a step face is formed between the lower limiting hole 19 and the assembly hole 14 by the fixed seat 10. The diameter of the assembly hole 14 is smaller than that of the cylindrical cavity 15, and the assembly hole is positioned below the lower limiting hole 19. The upper annular cavity 16 and the lower annular cavity 17 are each of an annular structure; the inner diameter of the upper annular cavity 16 and the inner diameter of the lower annular cavity 17 are both equal to the diameter of the cylindrical cavity 15; the upper annular cavity 16 is positioned at the upper end of the cylindrical cavity 15, and the upper annular cavity 16 communicates with the cylindrical cavity 15; the lower annular cavity 17 is positioned at the lower end of the cylindrical cavity 15, and the lower annular cavity 17 communicates with the cylindrical cavity 15; the connecting grooves 18 are positioned in the side face of the cylindrical cavity 15, and the connecting grooves 18 are straight; two connecting grooves 18 which are symmetrically distributed relative to the center line of the cylindrical cavity 15 are formed in the fixed seat 10; one end of each connecting groove 18 communicates with the upper annular cavity 16, and the other end of each connecting groove 18 communicates with the lower annular cavity 17; and the side faces of the connecting grooves 18 communicate with the cylindrical cavity 15. The width of the upper annular cavity 16 in the direction parallel to the center line of the fixed seat 10 is smaller than that of the lower annular cavity 17 in the direction parallel to the center line of the fixed seat 10.

The pin holes 13 are distributed in the lower end of the fixed seat 10, namely the narrow end of the main body 11; the pin holes 13 communicate with the assembly hole 14, the pin holes 13 are perpendicular to the assembly hole 14, and the pin holes 13 are distributed around the center line of the assembly hole 14 at equal angles. The lead screw 3 passes through the assembly hole 14, and the lead screw 3 is provided with a limiting groove 4; and the limiting groove 4 annularly surrounds the center line of the lead screw 3. One end of each dowel pin 27 is inserted into the corresponding pin hole 13, and the other end of each dowel pin 27 is embedded into the limiting groove 4. Therefore, the dowel pins 27 are distributed around the center line of the lead screw 3 at equal angles, the pin holes 13 are positioned in the outer pipe 1 after mounting, the outer pipe 1 shields the pin holes 13, and then the visual effect of hiding the pin holes 13 is achieved. The lead screw 3 is movably mounted on the fixed seat 10 through the dowel pins 27, and the lead screw 3 may rotate relative to the fixed seat 10. The center line of the lead screw 3 is overlapped with the center line of the fixed seat 10.

The lead screw 3 is provided with a flange 5, and the bearing 26 is mounted on the lead screw 3 and positioned between the flange 5 and the fixed seat 10; and the flange 5 is positioned above the nut 7.

A connecting section 6 is arranged at one end of the lead screw 3, and the cross section of the connecting section 6 is of a non-centrosymmetric structure such as regular hexagon. The connecting section 6 of the lead screw 3 passes through the cylindrical cavity 15 of the fixed seat 10 and protrudes out of the fixed seat 10, and the center line of the lead screw 3 is overlapped with the center line of the cylindrical cavity 15.

The movable sleeve 20 is also hollowed out and internally includes an upper limiting hole 24, a connecting hole 22 and an accommodating hole 23. The upper limiting hole 24, the connecting hole 22 and the accommodating hole 23 communicate with one another, and the center lines of the upper limiting hole 24, the center line of the connecting hole 22 and the center line of the accommodating hole 23 are overlapped with each other; the accommodating hole 23 is positioned above the connecting hole 22, and the upper limiting hole 24 is positioned below the connecting hole 22. The upper limiting hole 24 is of a structure with a circular cross section, the diameter of the upper limiting hole 24 is larger than the maximum width of the connecting hole 22, and therefore a step face is formed between the upper limiting hole 24 and the connecting hole 22 by the movable sleeve 20. The cross section of the connecting hole 22 is of a non-centrosymmetric structure, the cross section structure of the connecting hole 22 corresponds to the cross section structure of the connecting section 6, and therefore the cross section of the connecting hole 22 is also in a regular hexagon shape. The accommodating hole 23 is of a structure with a circular cross section, and the minimum width of the accommodating hole 23, namely the diameter of the accommodating hole 23 is larger than the maximum width of the connecting hole 22. A cylindrical part is arranged outside the movable sleeve 20, and two limiting columns 21 symmetrically distributed relative to the center line of the movable sleeve 20 are arranged on the surface of the cylindrical part of the movable sleeve 20. The handle 9 is mounted on the movable sleeve 20. The cylindrical part of the movable sleeve 20 stretches into the cylindrical cavity 15, the movable sleeve 20 is movably connected with the fixed seat 10, and the movable sleeve 20 may rotate in the fixed seat 10.

After the movable sleeve 20 is mounted, the connecting section 6 of the lead screw 3 extends into the movable sleeve 20, the lead screw 3 is movably connected with the movable sleeve 20, and two limiting columns 21 are symmetrically distributed relative to the center line of the lead screw 3; the moving range of the limiting columns 21 is in the upper annular cavity 16, the lower annular cavity 17, and the connecting grooves 18; and the limiting columns 21 are embedded into the upper annular cavity 16 or the lower annular cavity 17 or the connecting grooves 18 at any time. The spring 25 is mounted on the lead screw 3 and positioned between the movable sleeve 20 and the fixed seat 10; one end of the spring 25 is positioned in the upper limiting hole 24, and the other end of the spring 25 is positioned in the lower limiting hole 19. The spring 25 is in a compressed state all the time; the direction of a push force which is generated by the spring 25 pushing the limiting columns 21 and applied to the movable sleeve 20 is parallel to the connecting grooves 18, and it has the tendency of pushing the movable sleeve 20 out of the fixed seat 10, but is limited by the upper annular cavity 16 and the lower annular cavity 17; and the cylindrical part of the movable sleeve 20 can only be positioned in the fixed seat 10, and therefore, the moving range of the cylindrical part of the movable sleeve 20 intersects with the cylindrical cavity 15. In an initial state, there is only a state in which the movable sleeve 20 is embedded into the connecting hole 22 through the connecting section 6 and synchronously moves with the lead screw 3 in the circumferential direction around the center line of the lead screw 3, or a state in which the movable sleeve 20 is completely separated from the connecting hole 22 through the connecting section 6 and positioned in the accommodating hole 23 and asynchronously moves with the lead screw 3 in the circumferential direction around the center line of the lead screw 3.

When the movable sleeve 20 and the lead screw 3 are in a synchronous motion state, the whole connecting section 6 is embedded in the connecting hole 22, the connecting section 6 does not extend into the accommodating hole 23, and the connecting section 6 of the lead screw 3 and the movable sleeve 20 are in clearance fit, and have the same cross section, so that the lead screw 3 is certainly driven to move when the handle 9 is held to drive the movable sleeve 20 to rotate. The limiting columns 21 are positioned in the upper annular cavity 16; and the spring 25 always provides an upward support effect for the movable sleeve 20, so that the limiting columns 21 are always positioned in the upper annular cavity 16 during rotating the movable sleeve 20. At this time, the manual operation can be only performed through the handle 9.

When the movable sleeve 20 and the lead screw 3 are in an asynchronous motion state, the whole connecting section 6 is separated from the connecting hole 22, and the connecting section 6 extends into the accommodating hole 23; the connection relationship between the connecting section 6 of the lead screw 3 and the movable sleeve 20 is broken; at this time, even if the movable sleeve 20 is driven to move, the lead screw 3 cannot be driven to rotate through the movable sleeve 20; and the movable sleeve 20 and the lead screw 3 independently move. The connecting section 6 is positioned in the accommodating hole 23; a gap for accommodating the sleeve of the electric tool is formed between the connecting section 6 and the movable sleeve 20; and at this time, the electric operation can be only performed by mounting the sleeve on the connecting section 6 and manually holding the electric tool.

The process of switching between the synchronous motion state and the asynchronous motion state is the process of switching between the manual operation and the electric operation. If the current state is the synchronous motion state, the movable sleeve 20 is rotated and extruded downwards; after the limiting columns 21 are aligned with the connecting grooves 18, the limiting columns 21 can pass through the connecting grooves 18 accordingly till the movable sleeve 20 further extends into the fixed seat 10 and the limiting columns 21 are positioned in the lower annular cavity 17, then the movable sleeve 20 is rotated and released, the spring 25 is promoted to abut against the movable sleeve 20 so that the limiting columns 21 can be blocked by the main body 11 of the fixed seat 10, and finally the movable sleeve 20 is in a static state.

If the current state is the asynchronous motion state, the movable sleeve 20 is rotated; after the limiting columns 21 are aligned with the connecting grooves 18, the spring 25 pushes the movable sleeve 20 to move upwards till the limiting columns 21 are positioned in the upper annular cavity 16; at the moment, the spring 25 abuts against the movable sleeve 20, and therefore the movable sleeve 20 is kept in the upper annular cavity 16. When the connecting hole 22 is in butt joint with the connecting section 6 of the lead screw 3, the limiting columns 21 are positioned in the connecting grooves 18; because the width of the connecting grooves 18 is larger than that of the limiting columns 21, the movable sleeve 20 can rotate by a certain angle relative to the fixed seat 10 at the moment, and this rotating amplitude is used for the connecting hole 22 to be matched with the connecting section 6; and when the angle of the connecting section 6 cannot promote the cross section of the connecting section 6 to be exactly parallel to the cross section of the connecting hole 22, the movable sleeve 20 can be properly rotated to enable the angle posture of the connecting hole 22 to completely correspond to the angle posture of the connecting section 6, and thus the connecting hole 22 can be conveniently matched with the connecting section 6.

Embodiment II of the present disclosure is different from Embodiment I in that only one limiting column is arranged outside the movable sleeve.

Embodiment III of the present disclosure is different from Embodiment II in that only one connecting groove is formed in the fixed seat.

In the embodiments above, other non-centrosymmetric structures may be selected to obtain a corresponding number of embodiments, such as regular triangle, square, regular pentagon, four-petal quincunx, five-petal quincunx, six-petal quincunx, pentagram, hexagram, heptagram, octagram, nonagram, and decagram.

What is claimed is:

1. A top-driven jack, comprising an outer pipe (1), an inner pipe (2), a lead screw (3), a nut (7), a fixed part (8), and a handle (9), the inner pipe (2) extending into the outer pipe (1), the nut (7) being fixedly mounted on the inner pipe (2), the lead screw (3) being movably mounted in the outer pipe (1) through the fixed part (8), the lead screw (3) extending into the inner pipe (2), the lead screw (3) being engaged with the nut (7), wherein the fixed part (8) comprises a fixed seat (10), a movable sleeve (20), a spring (25), a bearing (26), and dowel pins (27); the fixed seat (10) is fixedly connected with the outer pipe (1), and the fixed seat (10) is provided with pin holes (13), an assembly hole (14), a cylindrical cavity (15), an upper annular cavity (16), a lower annular cavity (17), and two connecting grooves (18); the cylindrical cavity (15) communicates with the assembly hole (14), and a center line of the cylindrical cavity (15) is overlapped with a center line of the assembly hole (14); the cylindrical cavity (15) is positioned above the assembly hole (14); the pin holes (13) are perpendicular to the assembly hole (14); a diameter of the cylindrical cavity (15) is larger than a diameter of the assembly hole (14); an inner diameter of the upper annular cavity (16) and an inner diameter of the lower annular cavity (17) are both equal to the diameter of the cylindrical cavity (15); the upper annular cavity (16) is positioned at an upper end of the cylindrical cavity (15), and the upper annular cavity (16) communicates with the cylindrical cavity (15); the lower annular cavity (17) is positioned at a lower end of the cylindrical cavity (15), and the lower annular cavity (17) communicates with the cylindrical cavity (15); the connecting grooves are straight; one end of each connecting groove (18) communicates with the upper annular cavity (16), and the other end of each connecting groove (18) communicates with the lower annular cavity (17); a side surface of each connecting groove (18) communicates with the cylindrical cavity (15); the lead screw (3) passes through the assembly hole (14); one end of each dowel pin (27) is inserted into the corresponding pin hole (13); a limiting groove (4) is formed in the lead screw (3); the limiting groove (4) annularly surrounds the center line of the lead screw (3); the other end of each dowel pin (27) is embedded into the limiting groove (4); a flange is arranged on the lead screw (3); the bearing (26) is mounted on the lead screw (3) and positioned between the flange (5) and the fixed seat (10); the flange (5) is positioned above the nut (7); the movable sleeve (20) is provided with a cylindrical part; two limiting columns (21) are arranged on the surface of the cylindrical part of the movable sleeve (20); the handle (9) is mounted on the movable sleeve (20); a connecting hole (22) and an accommodating hole (23) are formed in the movable sleeve (20); the connecting hole (22) communicates with the accommodating hole (23), and a center line of the connecting hole (22) is overlapped with a center line of the accommodating hole (23); the accommodating hole (23) is positioned above the connecting hole (22), and a minimum width of the accommodating hole (23) is greater than a maximum width of the connecting hole (22); a cross section of the connecting hole (22) is of a non-centrosymmetric structure; a connecting section (6) is arranged at one end of the lead screw (3); a cross section of the connecting section (6) is of a non-centrosymmetric structure, and a cross section structure of the connecting section (6) corresponds to a cross section structure of the connecting hole (22); the connecting section (6) of the lead screw (3) extends into the movable sleeve (20); the end of the lead screw (3) provided with the connecting section (6) passes through the cylindrical cavity (15); the center line of the lead screw (3) is overlapped with the center line of the cylindrical cavity (15); the connecting section (6) protrudes out of the fixed seat (10); the cylindrical part of the movable sleeve (20) extends into the cylindrical cavity (15); the movable sleeve (20) is movably connected with the fixed seat (10); the lead screw (3) is movably connected with the movable sleeve (20); the spring (25) is mounted on the lead screw (3) and are positioned between the movable sleeve (20) and the fixed seat (10); the moving range of the cylindrical part of the movable sleeve (20) is intersected with the cylindrical cavity (15); the moving range of the limiting columns (21) is positioned in the upper annular cavity (16), the lower annular cavity (17) and the connecting grooves (18); the movable sleeve (20) is embedded into the connecting hole (22) through the connecting section (6) and synchronously moves with the lead screw (3) in the circumferential direction around the center line of the lead screw (3); and the movable sleeve (20) is completely separated from the connecting hole (22) through the connecting section (6) and positioned in the accommodating hole (23) and asynchronously moves with the lead screw (3) in the circumferential direction around the center line of the lead screw (3).

2. The top-driven jack according to claim 1, wherein two connecting grooves (18) which are symmetrically distributed relative to the center line of the cylindrical cavity (15) are formed in the fixed seat (10).

3. The top-driven jack according to claim 2, wherein two limiting columns (21) which are symmetrically distributed relative to the center line of the lead screw (3) are arranged on the surface of the cylindrical part of the movable sleeve (20).

4. The top-driven jack according to claim 1, wherein a lower end of the fixed seat (10) is embedded into the outer pipe (1), and a side face of an upper end of the fixed seat (10) is flush with a surface of the outer pipe (1).

5. The top-driven jack according to claim 1, wherein the fixed seat (10) comprises a main body (11) and an end cover (12); the end cover (12) is fixedly mounted on the main body (11) through a bolt; and the upper annular cavity (16) is positioned between the main body (11) and the end cover (12).

6. The top-driven jack according to claim 4, wherein the fixed seat (10) comprises a main body (11) and an end cover (12); the end cover (12) is fixedly mounted on the main body (11) through a bolt; and the upper annular cavity (16) is positioned between the main body (11) and the end cover (12).

7. The top-driven jack according to claim 4, wherein the dowel pins (27) are distributed around the center line of the lead screw (3) at equal angles, and the pin holes (13) are positioned in the outer pipe (1).

8. The top-driven jack according to claim 1, wherein the cross section structure of the connecting section (6) is in a shape of one of regular polygon, oval, quincunx and concave polygon.

9. The top-driven jack according to claim 1, wherein a width of the upper annular cavity (16) in a direction parallel to the center line of the lead screw (3) is smaller than a width of the lower annular cavity (17) in the direction parallel to the center line of the lead screw (3).

10. The top-driven jack according to claim 1, wherein an upper limiting hole (24) is formed in the movable sleeve (20), the upper limiting hole (24) is positioned below the connecting hole (22), and a diameter of the upper limiting hole (24) is larger than a diameter of the connecting hole (22); a lower limiting hole (19) is formed in the fixed seat (10), the lower limiting hole (19) is positioned below the cylindrical cavity (15), and a diameter of the lower limiting hole (19) is smaller than the diameter of the cylindrical cavity (15); and one end of the spring (25) is positioned in the upper limiting hole (24), and the other end of the spring (25) is positioned in the lower limiting hole (19).

* * * * *